Aug. 19, 1924.
J. A. SERRELL
1,505,293
LIQUID SUPPLY CONTROL APPARATUS
Filed Aug. 19, 1919　　　3 Sheets-Sheet 1
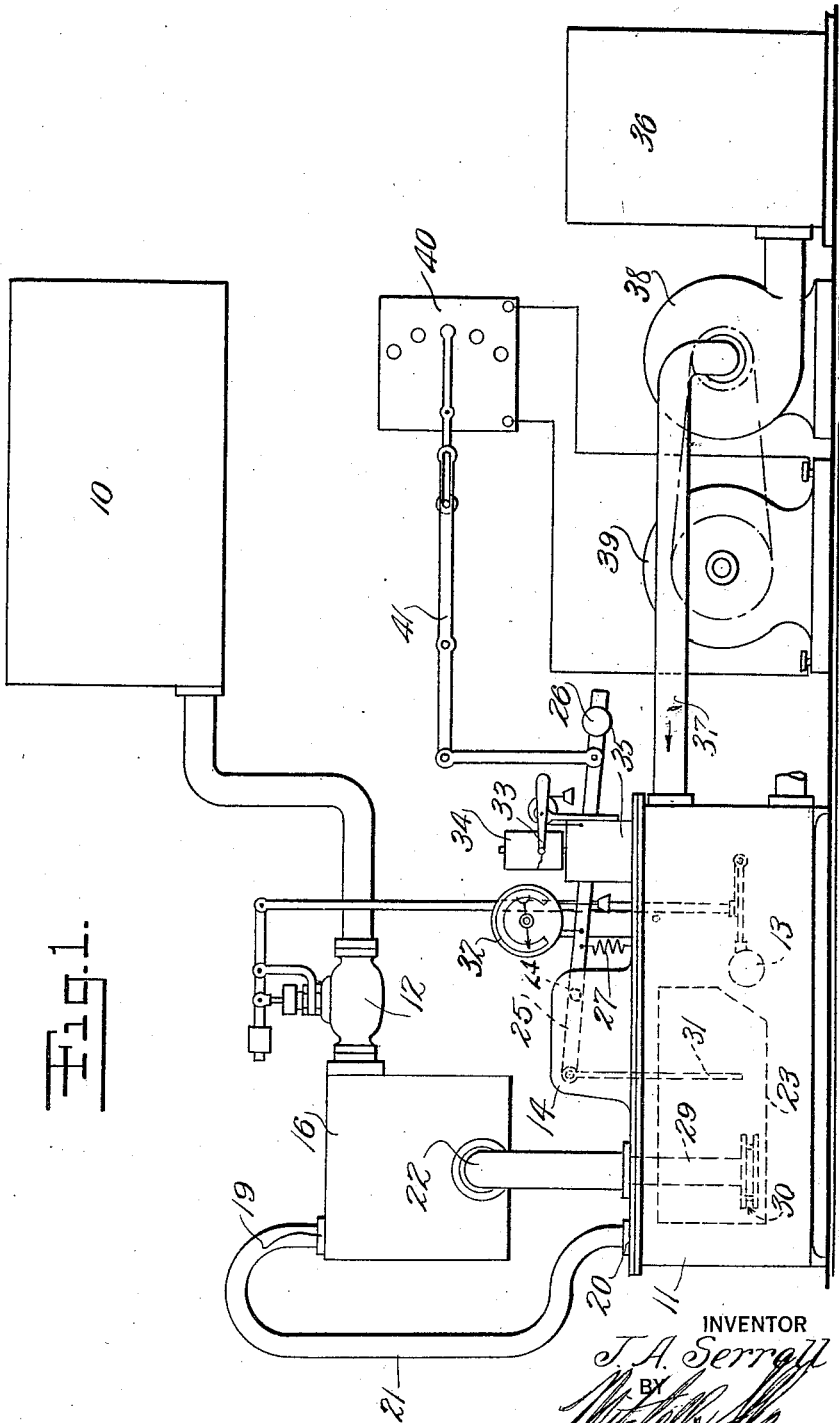
INVENTOR
J. A. Serrell
BY
ATTORNEY Aug. 19, 1924.
J. A. SERRELL
1,505,293
LIQUID SUPPLY CONTROL APPARATUS
Filed Aug. 19, 1919    3 Sheets-Sheet 2
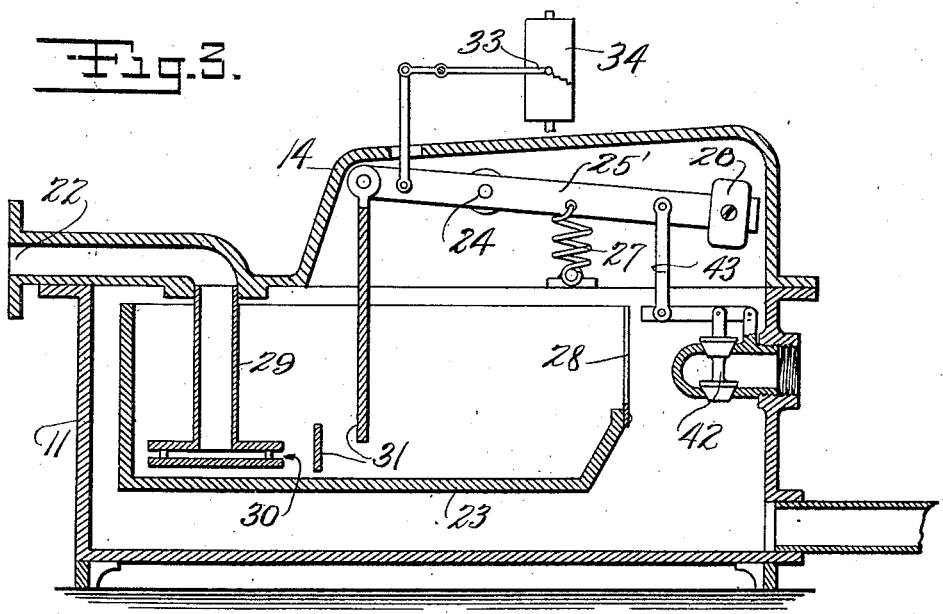
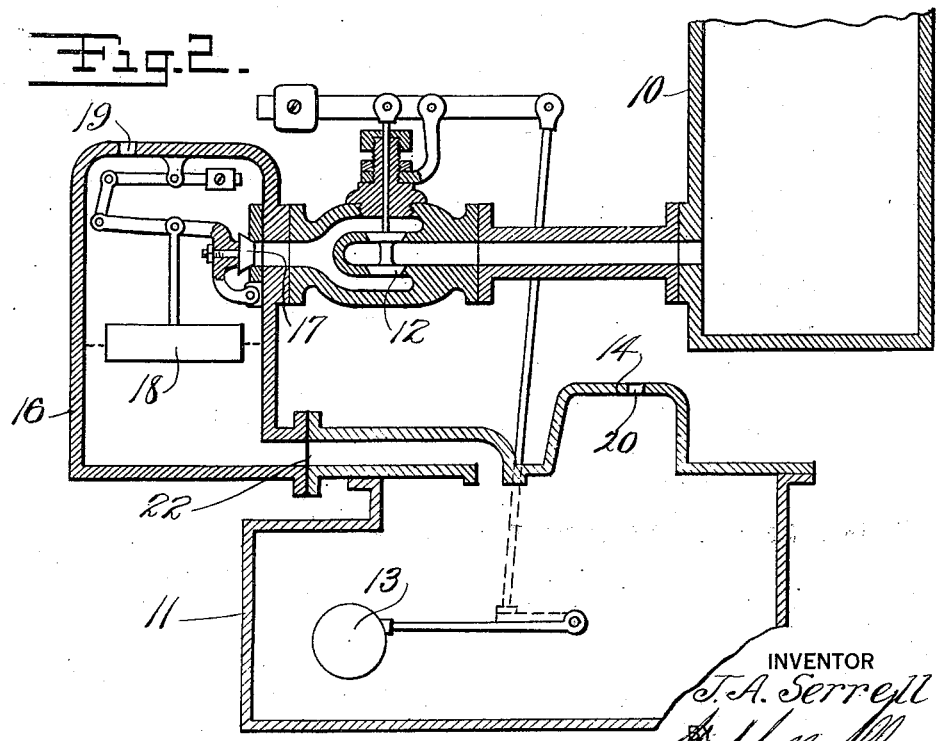
INVENTOR
J. A. Serrell
BY
ATTORNEY

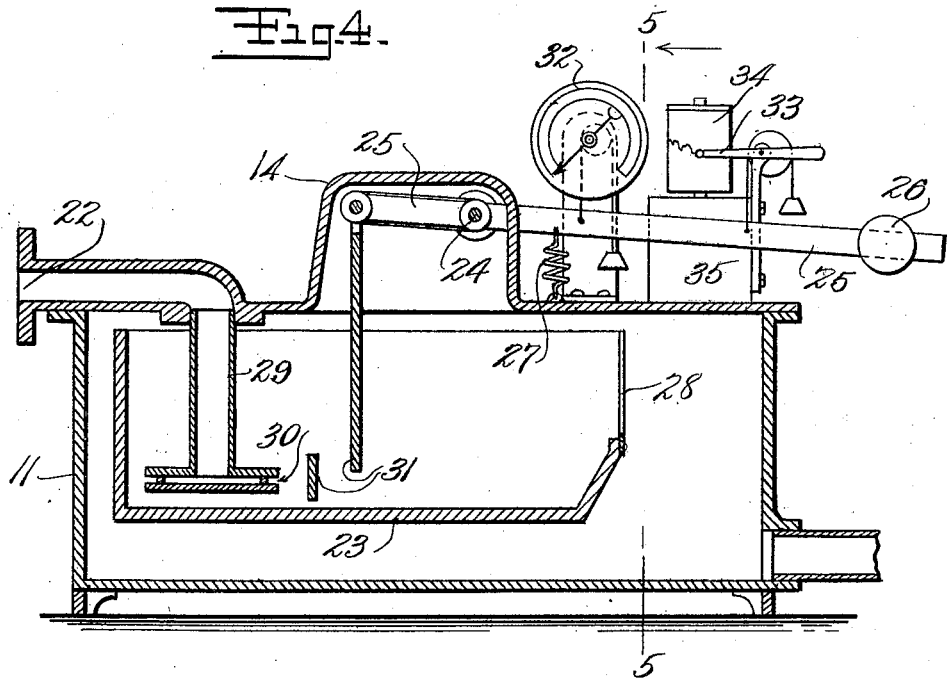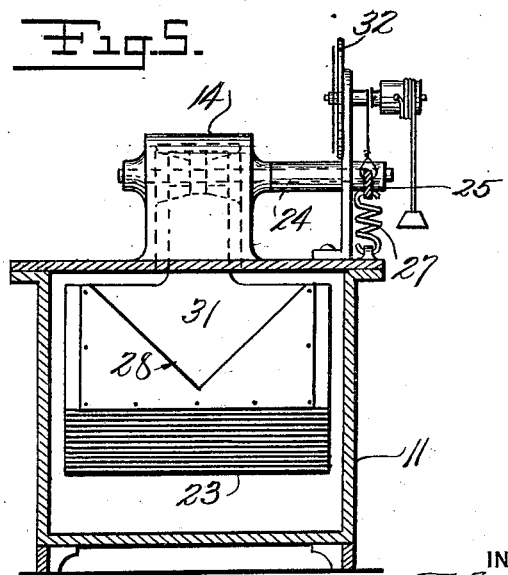

Patented Aug. 19, 1924.

1,505,293

UNITED STATES PATENT OFFICE.

JOHN A. SERRELL, OF NORTH PLAINFIELD BOROUGH, NEW JERSEY.

LIQUID-SUPPLY-CONTROL APPARATUS.

Application filed August 19, 1919. Serial No. 318,605.

*To all whom it may concern:*

Be it known that I, JOHN A. SERRELL, a citizen of the United States of America, residing at borough of North Plainfield, New Jersey, have invented a new and useful Liquid-Supply-Control Apparatus, of which the following is a specification.

My invention relates particularly to apparatus for regulating and measuring the supply of liquids.

One object is to accurately measure the supply of liquid flowing from a primary source to a tank or secondary receiver.

Another object is to control the supply in a uniform manner.

Another object is to accurately measure and indicate the flow of liquid.

Another object is to accurately measure and record or register the flow.

Another object is to control the mixture of two liquids in desired proportions.

For carrying out the complete process, liquid is allowed to flow from a primary receiver to a storage tank or receiver through an automatic regulating valve controlled by the level of liquid in the storage receiver.

Between this valve and the storage receiver is located the meter which measures indicates and records the weight of liquid passing into the storage receiver.

Between this automatic valve and the meter is located a static head trap which limits the head of liquid passing to the meter.

The meter is preferably of a special type of V-notch weir box in which the varying head or height of liquid above the zero line is determined. Instead of measuring the height above the zero line directly, which is an inaccurate method, I prefer to construct the weir box and support it in such a manner as to weigh the liquid in excess of that contained in the box at the zero line.

This invention particularly adapts itself to the mixing of liquids in desired proportions, for instance, the introduction of some foreign fluid or chemical into water. Parts of the weighing mechanism may be utilized to control the delivery of a pump which supplies the foreign liquid, or the total head weight above the zero line in the meter may be used to actuate a graduating valve mechanism controlling the introduction of the foreign liquid in its proper proportion with the liquid passing over the weir of the meter.

Fig. 1 is a diagrammatic view of apparatus embodying the improvements of my invention.

Fig. 2 is a vertical sectional view showing the automatic valve and static head control, the weighing parts being omitted.

Fig. 3 is a longitudinal vertical section of a recording meter with a graduating valve for automatically controlling the introduction of another liquid.

Fig. 4 is a longitudinal vertical sectional view showing indicating and recording mechanism for the meter.

Fig. 5 is a transverse sectional view of the same.

The primary receiver 10 supplies the main body of liquid to the storage tanks or receiver 11. Between these is located an automatic valve 12 connected to a float 13 so that the valve is open when the liquid level in the storage receiver falls. The primary receiver may be considered as an open feed heater supplying liquid to a pump suction. The meter 14 measures the liquid as it flows into the tank or storage receiver 11 and will be described later. Between the meter and the valve 12 I have located what may be termed a static head trap 16 provided with a valve 17 and a float 18 so that the valve is opened and closed by changes in level of the liquid in the trap. A limited maximum head of liquid above the meter is thus maintained even though the pressure in the primary receiver 10 varies considerably. By thus maintaining a limited static head, the action of the meter is more uniform.

The trap 16 and the tank 11 may be vented as at 19 and 20 or connected by a pipe 21 so as to equalize the air pressure in the two chambers.

Between the trap and the meter I preferably provide a device 22 with a definite or controllable or variable size of orifice. By this invention the flow of the weir box of the meter will never be greater than that due to the maximum liquid head in the trap flowing through the orifice in 22 and therefore determinable. The orifice may be in the form of a thin plate or in a suitable variable restriction. In some cases it is preferable to be able to vary the size of the orifice to conform to a maximum percentage of use, for instance, where a meter is designed for a maximum flow, but may be required for sometime to be run at a small percentage of its maximum capacity. This invention is applicable to and particularly desirable in connection with all types of meters when subject to varying flow pressure and especially to those in which a maximum fluid line is maintained in some sort of a receiver beyond the metering device proper.

In the meter itself the weir box 23 is supported from the shaft 24 by one end of the lever 25. An equalizing weight 26 is shown on the opposite end of this lever and a spring 27 is interposed between the weight and the pivotal axis of the shaft 24. The orifice 28 of the weir may be of any suitable section, for instance, V shape. Some of the liquid in the box 23 begins to flow out when the level rises above the zero line and the rate of flow will depend upon the vertical depth of the liquid above the zero line. Liquid is introduced into the box 23 through a distributing head 29 preferably provided with a lateral orifice or orifices 30 so that there will be no vertical component of impact from the inflowing liquid. Baffles such as 31—31 may also be provided to prevent surging of the liquid and disturbance in the weighing. An indicator 32 is shown connected to one arm of the lever 25 for indicating over a proper scale the flow of liquid. This scale may of course be calibrated to read in such units as are desired. In a similar way a card or record may be kept by a pencil or stylus 33 travelling on a drum 34 which is driven for instance by clockwork mechanism 35.

By this method of weighing the total liquid in the weir box above the level of the outlet, greater power is available for the operation of the measuring, indicating, registering and recording devices, than would be available with the use of a float or other device used for merely measuring the vertical depth of the liquid.

This same weighing mechanism may be utilized to control the introduction of another liquid, for instance, as in water softening processes. In this case the auxiliary receiver 36 for this second liquid may be connected to the storage reservoir 11 by the pipe 37 and flow of the liquid may be induced by a pump 38 driven by the electric motor 39. The speed of this motor may be controlled by a suitable rheostat 40 whose arm is connected by suitable mechanism 41 to a moving part of the meter, such, for instance, as the main lever arm 25. As the weir box rises and falls the rheostat is thus operated to control the motor and the pump and thus increases or decreases the quantity of liquid to be added.

Instead of controlling the pump the secondary liquid may be introduced past a graduating valve 42 which is connected by levers such as 43 to some moving part of the meter such for instance as the lever arm 25'. The amount of secondary liquid admitted to the storage reservoir will thus be controlled in direct proportion with the quantity of liquid passing through the weir box of the meter.

It should be understood that the static head control feature of my invention may be used with other forms of meters and with or without mechanism for supplying a secondary liquid. It should also be understood that the particular type of meter herein shown and described may be used without the static head control feature and may be used with or without the mechanism for supplying the secondary liquid. It should also be understood that the mechanism for automatically controlling the introduction of a secondary liquid in proportion to the primary liquid may be used without the static head control, and may be used with other forms of meters. The claims are, therefore, intended to cover the various features of the invention as set forth.

The apparatus for controlling the supply of liquids is claimed in my application #652,292, filed July 18, 1923.

I claim:

1. A liquid meter comprising a yieldingly suspended weir box and means for weighing the liquid momentarily in the weir box.

2. In a liquid meter, a vertically movable weir box and means for continuously weighing the liquid flowing through said weir box.

3. In a liquid meter, a vertically movable weir box and means for continuously recording variations in weight of the liquid passing through said weir box.

4. In a liquid meter, a vertically movable weir box and a weighing device and scale connected thereto for indicating the weight of liquid passing through the weir box.

5. In a liquid meter, a vertically movable weir box, a distributing head substantially closed at the bottom and having lateral orifices and means for weighing the liquid flowing through said weir box.

6. In a liquid meter, a vertically movable weir box and weighing mechanism actuated by the vertical movement thereof.

7. In a liquid meter, a receiver, a weir box movably suspended within the receiver, a discharge head extending within the weir box but free therefrom, and means for continuously indicating the weight of liquid momentarily in the weir box.

8. In a liquid meter, a receiver, a weir box movably suspended within the receiver, a discharge head extending downwardly into the weir box, and means for weighing the liquid momentarily in the weir box.

9. In a liquid meter, a receiver, a weir box movably supported within said receiver, a head free from connection with said weir box for discharging liquid within said weir box, and means for weighing liquid momentarily in said weir box.

10. In a liquid meter, a receiver, a movable weir box within said receiver, a discharge head for delivering liquid into said weir box without interfering with the movement thereof, means for measuring the liquid momentarily in said weir box, and means for controlling the flow of liquid through said receiver.

11. In a liquid meter, a receiver, a weir box movable therein, a discharge head for delivering liquid into said weir box and having its discharge orifice at a fixed height above the bottom of the receiver, and means connected with said weir box for indicating the weight of liquid momentarily in the weir box.

JOHN A. SERRELL.